Feb. 22, 1938. S. M. RANSOME 2,109,033
PRECISION MOTION TRANSMISSION MECHANISM
Filed Sept. 8, 1936
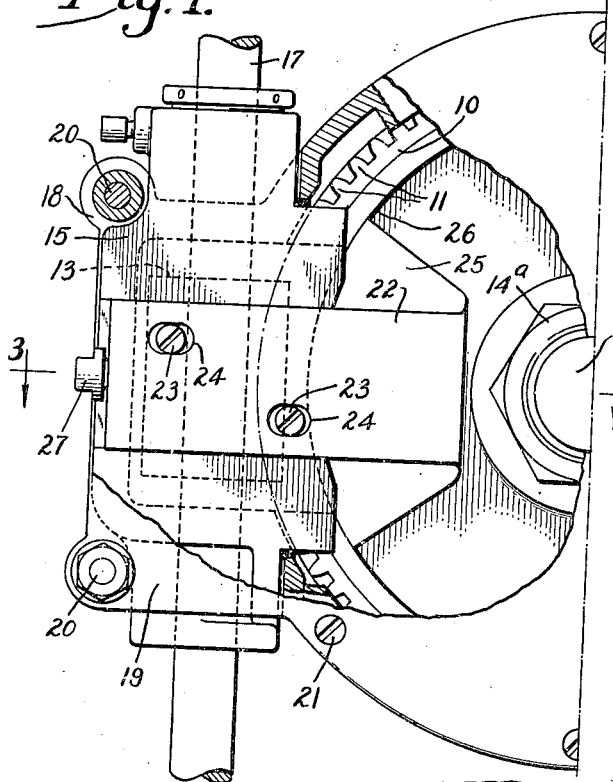
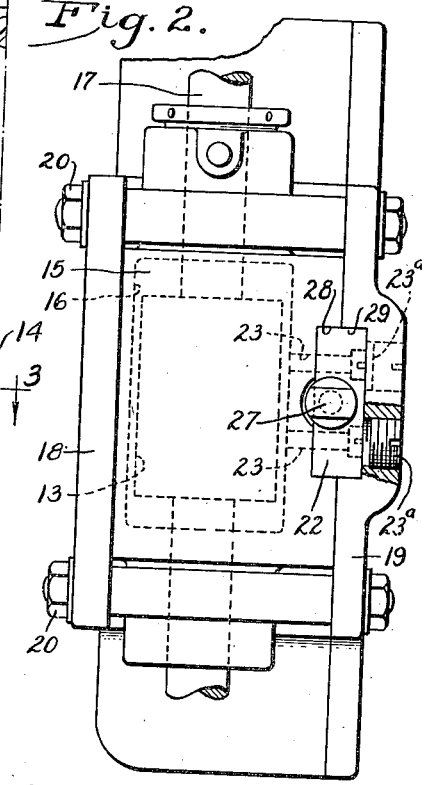
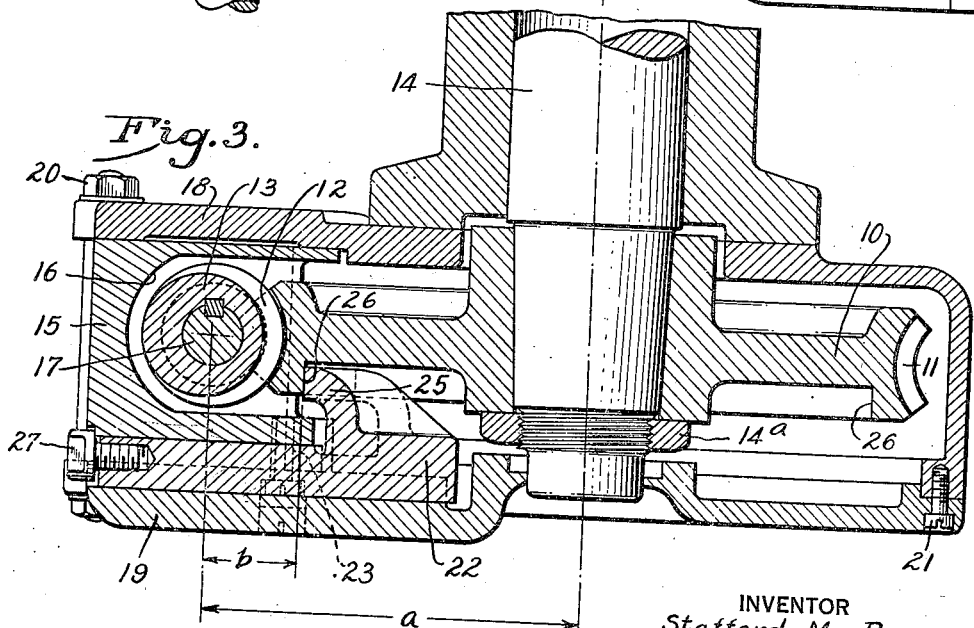
INVENTOR
Stafford M. Ransome
BY
ATTORNEYS Patented Feb. 22, 1938

2,109,033

UNITED STATES PATENT OFFICE 2,109,033

PRECISION MOTION-TRANSMISSION MECHANISM

Stafford M. Ransome, Rockford, Ill., assignor to Barber-Colman Company, Rockford, Ill., a corporation of Illinois Application September 8, 1936, Serial No. 99,708

13 Claims. (Cl. 74—396)

The invention relates to precision motion-transmission mechanisms and more particularly to mechanisms of this character adapted for use in indexing various parts of machine tools.

In many devices such as machine tools, for example, it is necessary to move or index certain parts of the device to predetermined positions with great nicety and precision in order to attain the desired accuracy in the machining operation to be performed. Indexing mechanisms of this character frequently include meshing gears or other rotatable toothed members through which the desired motion is transmitted from a suitable manual or power actuated device. In such case, if a worm gear and worm are used, for example, the clearances between the worm thread and worm teeth must be very small in order to preclude any inaccuracy in the resultant movement effected by the mechanism due to relative rotation between the meshing parts. Difficulty has heretofore been encountered in attempting to utilize worm and worm gear connections and the like in such indexing mechanisms, however, since heat is generated by the friction between the engaging surfaces of the toothed members of the mechanism. This heat serves to expand the toothed members causing the generation of even more heat and this cycle continues until binding and stoppage of the worm and gear rotation results. Moreover, there is often injury to or even destruction of the mating gear surfaces through "loading", "scoring" or "galling" as it is variously described.

The primary object of the present invention is to provide a precision motion-transmission mechanism comprising a pair of meshing toothed members as well as an arrangement for maintaining the mating toothed surfaces of such members in substantially uniform engagement irrespective of thermally induced expansion and contraction of the members so that a desired motion may be transmitted thereby with great accuracy and precision while at the same time, danger of injury to the mating surfaces of the members is avoided.

A more specific object of the invention is to provide a precision motion-transmission mechanism including a meshing worm and worm gear as well as means for slidably supporting the worm for radial movement with respect to the worm gear to accommodate thermal expansion and contraction thereof, and means for maintaining the mating toothed surfaces of the members in substantially uniform engagement irrespective of such relative movement.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawing in which, Figure 1 is a partial plan view of a worm and worm gear type precision motion-transmitting mechanism embodying the invention, a portion of the gear casing being broken away in order to illustrate the internal arrangement of the parts.

Fig. 2 is a side elevation of the mechanism shown in Fig. 1, and

Fig. 3 is a transverse sectional view along the line 3—3 in Fig. 1.

In the device illustrated, the invention is exemplified as embodied in a worm and worm gear type precision motion-transmitting mechanism particularly adapted for use in various sorts of machine tools. This mechanism includes a worm gear 10 provided with peripherally disposed arcuate teeth 11 meshing with a helical thread or tooth 12 of a worm 13. The worm gear 10 is rigidly mounted on a rotatable shaft 14, being clamped on the tapered outer end thereof by lock nut 14ª, which is threaded on the shaft. The mating toothed surfaces of the worm gear 10 and worm 13 are machined with great nicety and precision so that a very small clearance therebetween will be had. As a result, rotative motion of the worm, for example, will be transmitted to the worm gear without inaccuracy due to backlash or other relative rotational movement between the members. It will be seen that if the distance "a" between the axes of the worm and worm gear, respectively, is fixed, a thermal expansion of the worm and worm gear during operation will cause the same to bind and in some cases seriously injure the engaging surfaces thereof so that the accuracy of the mechanism will be spoiled.

In accordance with the present invention, an arrangement is provided for accommodating relative bodily movement between the cooperating toothed members so that the mating surfaces thereof will be maintained in substantially uniform engagement, that is, positively maintained with a fixed uniform working clearance therebetween. In the preferred construction illustrated, the worm 13 is mounted for floating movement with respect to the worm gear 10 in a supporting block 15. The block 15 is provided with a recess 16 therein having an open side located adjacent the periphery of the worm gear 10. The worm 13 is keyed to a rotatable shaft 17 journaled in the end walls of the block 15. The block 15 is slidably mounted for radial movement with respect to the worm gear 10 between the opposed faces of inner and outer casing members 18 and 19. The inner casing member 18 is substantially cup-shaped and surrounds the rear side and periphery of the worm gear as well as the block 15. The outer casing member 19 is substantially disk-shaped and is provided with a radially extending portion disposed over the block 15. The outwardly projecting portions of the casing members 18 and 19 are secured together by bolts 20 while the opposite portions thereof are secured together by screws 21.

An arrangement is also provided, which is preferably adjustable, for limiting the relative radial movement between the engaging toothed portions of the worm gear and worm so that they will be maintained in substantially uniform engagement. In the construction illustrated, this arrangement includes a substantially rectangular plate 22 adjustably secured to the outer face of the block 15 by screws 23 passing through elongated apertures 24 in the plate 22 and threaded in suitable tapped holes formed in the block. Access may be had to screws 23 through registering holes formed in the casing cover 19 and normally closed by threaded plugs 23a. A sector-shaped lug 25 projects from the plate 22 and bears against an inwardly facing shoulder 26 formed on the inner side of the rim of worm gear 10. An adjusting screw 27 threaded in a tapped hole formed in the outer end of plate 22 and disposed with its head bearing against the adjacent end portion of block 15 serves to adjust the position of the plate 22 and its attached lug 25 with respect to the block 15. As a result, when the plate 22 is moved outwardly, for example, by the adjusting screw 27, the block 15 is moved inwardly so that the worm thread 12 is brought more closely into mesh with the worm gear teeth 11. Similarly, when the plate 22 is moved in the opposite direction a greater clearance is provided between the toothed members. The working clearance between the toothed members may thus be initially adjusted to any predetermined amount.

Upon reference to Fig. 2, it will be seen that the plate 22 is mounted in registering grooves 28 and 29 formed in the adjacent surfaces of the block 15 and casing member 19. The side walls of these grooves are disposed in a generally radial direction with respect to the worm gear 10 and form fixed guides limiting the direction of movement of the plate 22 and its attached supporting block 15. As a result, the relative bodily movement between the worm gear and worm is confined to a plane coincident with the axis of rotation of the worm and transverse with respect to the axis of rotation of the worm gear.

In the operation of the mechanism described, if the worm gear 10 and worm 13 become heated due to the friction of their contacting surfaces and thermal expansion thereof results, the slidable mounting of the supporting block 15 permits the worm 13 to move bodily outward so as to accommodate this thermal expansion. At the same time, the lug 25 engaging the shoulder 26 on the worm wheel prevents relative outward movement of the worm teeth 12 with respect to the worm gear teeth 11. In other words, the fixed distance is no longer the distance "a" between the axis of the worm gear and worm but is the much shorter distance "b" between the axis of the worm gear and the shoulder 26 on the worm gear. As a matter of fact, a compensating change in the distance "b" is had when the worm, worm gear and plate 22 are all made of material having substantially the same coefficient of thermal expansion. When made of such material, the plate 22 will be heated up to some extent so that the distance "b" will be increased slightly to compensate for any increase in the size of the teeth 11 and 12. As a result, the worm and worm gear teeth are maintained in substantially uniform engagement so that the clearance therebetween does not vary an appreciable amount even though the diameters of the worm and worm gear change due to thermal expansion.

Although a particular embodiment of the invention has been illustrated in connection with a worm and worm gear precision motion-transmission mechanism particularly designed for use in machine tools, there is no intention to thereby limit the invention to the particular construction illustrated and described but on the other hand, the appended claims are intended to cover all modifications within the spirit and scope of the invention.

I claim as my invention:

1. A precision motion-transmission mechanism comprising a worm gear, a worm meshing therewith, means supporting said worm and worm gear for bodily relative movement therebetween in a plane coincident with the axis of said worm and transverse to the axis of said worm gear, and means for rigidly and positively maintaining the mating toothed surfaces of said worm and worm gear in engagement with an exact and predetermined working clearance therebetween irrespective of said bodily movement.

2. A precision motion-transmission mechanism comprising a worm gear, a worm meshing therewith, means supporting said worm and worm gear for bodily relative movement therebetween in a plane coincident with the axis of said worm and transverse to the axis of said worm gear, means for maintaining the mating toothed surfaces of said worm and worm gear in substantially uniform engagement irrespective of said bodily movement, and means for adjusting the clearance between the mating toothed surfaces of said worm and worm gear.

3. A precision motion-transmission mechanism comprising a pair of meshing toothed members, means supporting one of said members for rotation about a fixed axis, means floatingly supporting the other of said members for rotation about an axis displaced from said first-named axis a variable distance thereby accommodating differences in diameter of said members resulting from thermal expansion and contraction thereof, and means for rigidly and positively maintaining the toothed surfaces of said members in engagement with an exact and predetermined working clearance therebetween irrespective of the displacement between said axes.

4. A precision motion-transmission mechanism comprising a pair of meshing toothed members rotatable about individual axes, means supporting said members for bodily relative movement toward and away from each other upon contraction and expansion thereof, and means for rigidly and positively maintaining the mating toothed surfaces of said members in engagement with an exact and predetermined working clearance therebetween irrespective of said bodily movement.

5. A precision motion-transmission mechanism comprising a pair of meshing toothed members rotatable about individual axes, means supporting said members for bodily relative movement toward and away from each other upon contraction and expansion thereof, means for maintaining the mating toothed surfaces of said members in substantially uniform engagement irrespective of said bodily movement, and means for adjusting the clearance between said mating toothed surfaces of said members.

6. A precision motion-transmission mechanism comprising a pair of meshing toothed members, and means for rigidly and positively maintaining the mating toothed surfaces of said members in engagement with an exact and predetermined working clearance therebetween irrespective of thermally induced expansion and contraction of said members.

7. A precision motion-transmitting mechanism comprising a worm gear mounted for rotation about a relatively fixed axis, a worm meshing with said worm gear, means slidably supporting said worm for radial movement with respect to said worm gear to accommodate thermal expansion and contraction of said worm and worm gear, and means for rigidly and positively maintaining the meshing toothed surfaces of said worm and worm gear in engagement with an exact and predetermined working clearance therebetween irrespective of said radial movement.

8. A precision motion-transmitting mechanism comprising a worm gear mounted for rotation about a relatively fixed axis, a worm meshing with said worm gear, means slidably supporting said worm for radial movement with respect to said worm gear to accommodate thermal expansion and contraction of said worm and worm gears, means for maintaining the meshing toothed surfaces of said worm and worm gear in substantially uniform engagement irrespective of said radial movement, and means for adjusting the clearance between the meshing surfaces of said worm and worm gear.

9. A precision motion-transmitting mechanism comprising a worm gear having an inwardly facing shoulder extending about the outer portion thereof, a supporting block, a worm journaled in said block and meshing with said worm gear, fixed guides supporting said block for floating movement radially of said worm gear to accommodate thermal expansion and contraction of said worm and worm gear, and means including a projection carried by said block and engaging said shoulder for preventing disengagement of said worm and worm gear during such floating movement.

10. A precision motion-transmitting mechanism comprising a worm gear having an inwardly facing shoulder extending about the outer portion thereof, a supporting block disposed adjacent the periphery of said worm gear and having a recess in the adjacent side thereof, a worm journaled in said recess in said block and meshing with said worm gear, fixed guides supporting said block for floating movement radially of said worm gear to accommodate thermal expansion and contraction of said worm and worm gear, a plate having a projection thereon engageable with said shoulder on said worm gear, and means for adjustably securing said plate to said block for selectively maintaining a predetermined clearance between the engaging portions of said worm and worm gear irrespective of said floating movement of said block.

11. A precision motion-transmitting mechanism comprising a worm gear having an inwardly facing shoulder extending about the outer portion thereof, a supporting block disposed adjacent the periphery of said worm gear for floating movement and having a recess in the adjacent side thereof, a worm journaled in said recess in said block and meshing with said worm gear, an enclosing casing extending about said worm and worm gear, a plate having a projection thereon engageable with said shoulder on said worm gear, and means for adjustably securing said plate to said block for selectively maintaining a predetermined clearance between the engaging portions of said worm and worm gear irrespective of said floating movement of said block, said casing having a slot formed therein adapted to receive said plate and guide the same for floating radial movement with respect to said worm gear to accommodate thermal expansion and contraction of said worm and worm gear.

12. In a precision motion-transmission mechanism comprising, a pair of meshing toothed members, means supporting said toothed members for relative bodily movement toward and away from each other, and means including a thermally expansible and contractible member exposed to the heat generated in said members during the operation thereof for shifting the same bodily toward and away from each other to positively maintain a predetermined working clearance between the mating toothed surfaces thereof.

13. A precision motion-transmission mechanism comprising, a pair of relatively rotatable meshing toothed members, means supporting said members for bodily movement toward and away from each other, and means including a rigid member movable bodily with one of said toothed members and engaging the other of said toothed members adjacent the toothed portion thereof for positively maintaining a predetermined working clearance between the mating toothed surfaces thereof, said rigid member having a coefficient of thermal expansion substantially equal to the coefficient of thermal expansion of said toothed members.

STAFFORD M. RANSOME.